June 24, 1958 V. H. BUTLER 2,839,907
AUTOMATIC LENGTH CONTROL MECHANISM FOR KNITTING MACHINES
Filed March 30, 1955 6 Sheets-Sheet 3

FIG.3.

INVENTOR
VAUGHN H. BUTLER

BY Cushman, Darby & Cushman
ATTORNEYS

INVENTOR
VAUGHN H. BUTLER

BY Cushman, Darby & Cushman
ATTORNEYS

June 24, 1958 V. H. BUTLER 2,839,907
AUTOMATIC LENGTH CONTROL MECHANISM FOR KNITTING MACHINES
Filed March 30, 1955 6 Sheets-Sheet 5

INVENTOR
VAUGHN H. BUTLER

BY
Cushman, Darby & Cushman
ATTORNEYS

June 24, 1958 V. H. BUTLER 2,839,907
AUTOMATIC LENGTH CONTROL MECHANISM FOR KNITTING MACHINES
Filed March 30, 1955 6 Sheets-Sheet 6
*FIG. 9.*
*FIG. 10.*
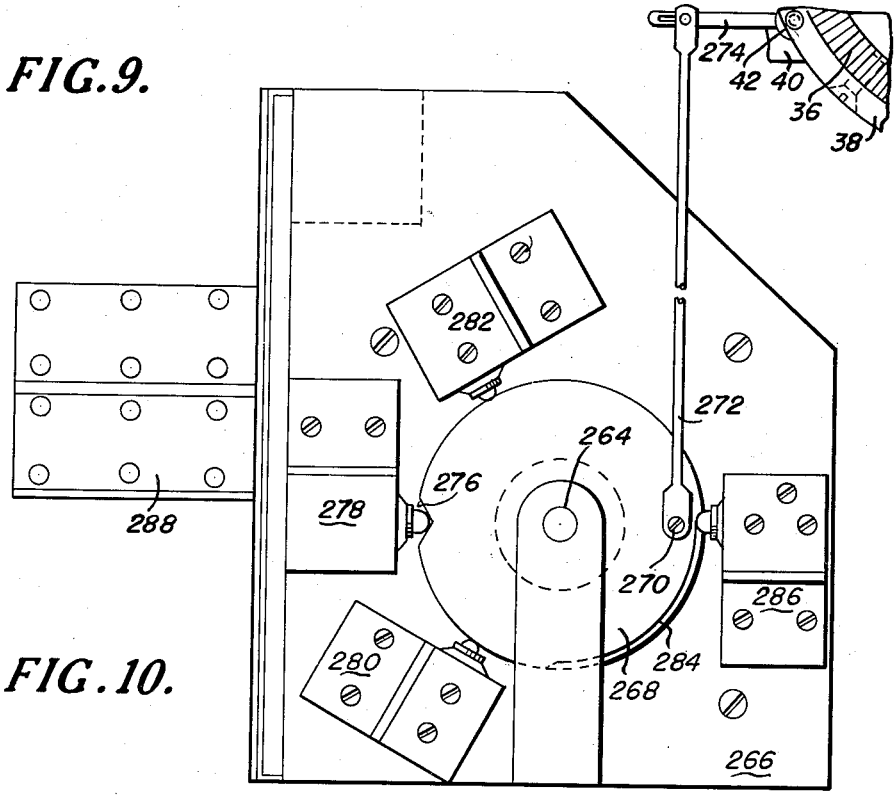
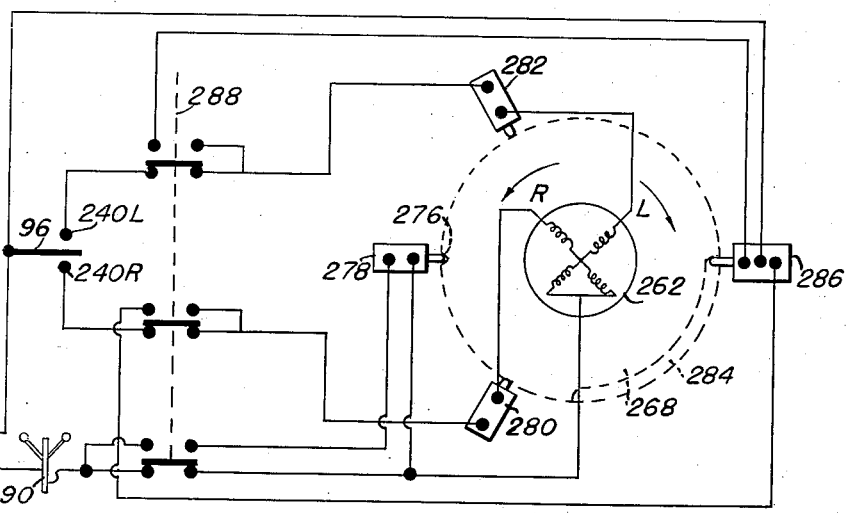
INVENTOR
VAUGHN H. BUTLER
BY
Cushman, Darby & Cushman
ATTORNEYS United States Patent Office 2,839,907
Patented June 24, 1958

2,839,907

AUTOMATIC LENGTH CONTROL MECHANISM FOR KNITTING MACHINES

Vaughn H. Butler, Harriman, Tenn., assignor to Burlington Industries, Inc., Greensboro, N. C., a corporation of Delaware Application March 30, 1955, Serial No. 498,038

34 Claims. (Cl. 66—55)

This invention relates to the knitting of tubular fabrics, and in particular to circular knitting machines of the types commonly employed in the commercial production of seamless hosiery and the like.

A prime objective in the knitting of seamless hosiery is the production of stockings of uniform size and contour, and free from defects such as irregular shading, streaks, lines and rings which detract from the appearance and value thereof. Conventional circular knitting machines include improved pattern control means of one form or another to effect uniformity of size and contour, and recently automatic draw-off devices which maintain uniform tension on the knitted fabric have been developed to further these objectives, and to eliminate defects due to irregular or varying stitch formation. In spite of these advances, non-uniform and imperfect stockings may yet be produced, due to extraneous factors such as variations in the yarn supplied, the tension of the feed yarn, the speed and even the temperature of the knitting machine. Particularly troublesome is the production of stockings varying substantially in length. This problem may be magnified in multiple feed machines, and in the knitting of stretch fabrics.

It is a principal object of the present invention to provide automatic length control mechanism for knitting machines, adapted to effect and maintain product uniformity and reproducibility of a degree not heretofore possible.

Another object is to provide automatic length control mechanism which may be readily applied to conventional circular knitting machines, utilizing the standard mechanisms thereof without major alteration or reconstruction.

A further object is to provide in knitting machines provided with automatic draw-off devices a novel detecting mechanism capable of sensing slight changes in the spacing between successive courses both accurately and quickly, and a correcting mechanism adapted to offset such changes before they exceed tolerable limits. Further objects will be in part evident and in part pointed out hereinfter.

In controlling and maintaining uniform the stitch length of a knitting machine, the ultimate criterion of performance is the rate of actual fabric production, that is the length of the stitch loops actually being produced, and it is on this principle that my novel mechanism is adapted to function. According to my invention, the conventional pattern control means of the knitting machine is fully utilized as heretofore, but a corrective adjustment is superimposed thereon during at least some portions of the knitting cycle, to accurately compensate for all factors of variance which may affect the standard operation. My invention is of particular value in connection with knitting machines provided with automatic draw-off devices of the type described and claimed in my Patent No. 2,694,304, issued November 16, 1954.

The invention and the novel features thereof may best be made clear from the following description and the accompanying drawings, in which:

Figure 3:
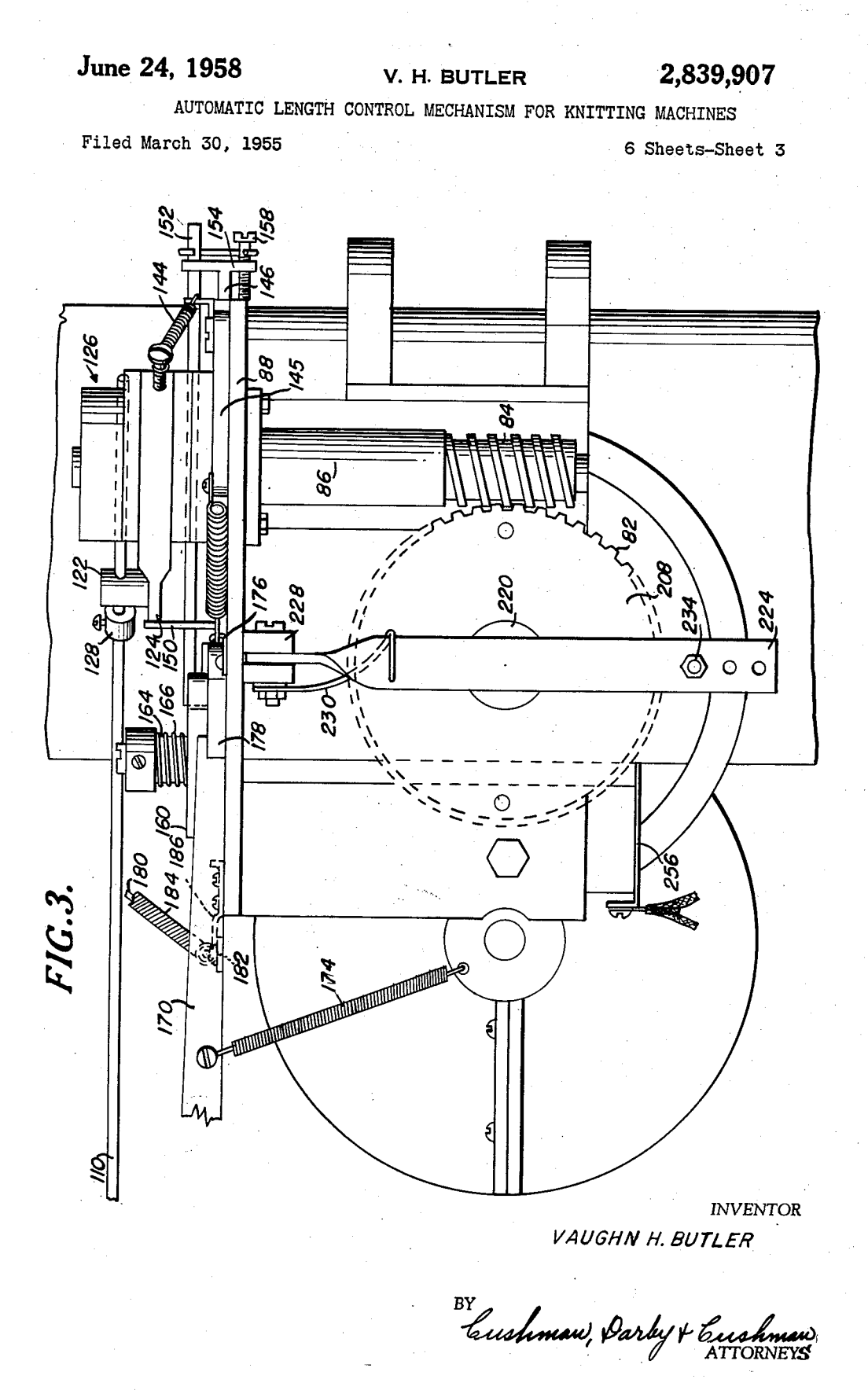

Figure 3 is an elevational view taken on the line 3—3 of Figure 2;

Figure 9 is a plan view, on enlarged scale, taken on the line 9—9 of Figure 1, showing the correcting mechanism of the invention, and Figure 10 is a simplified electrical diagram of the stitch length control mechanism.

Figure 1:
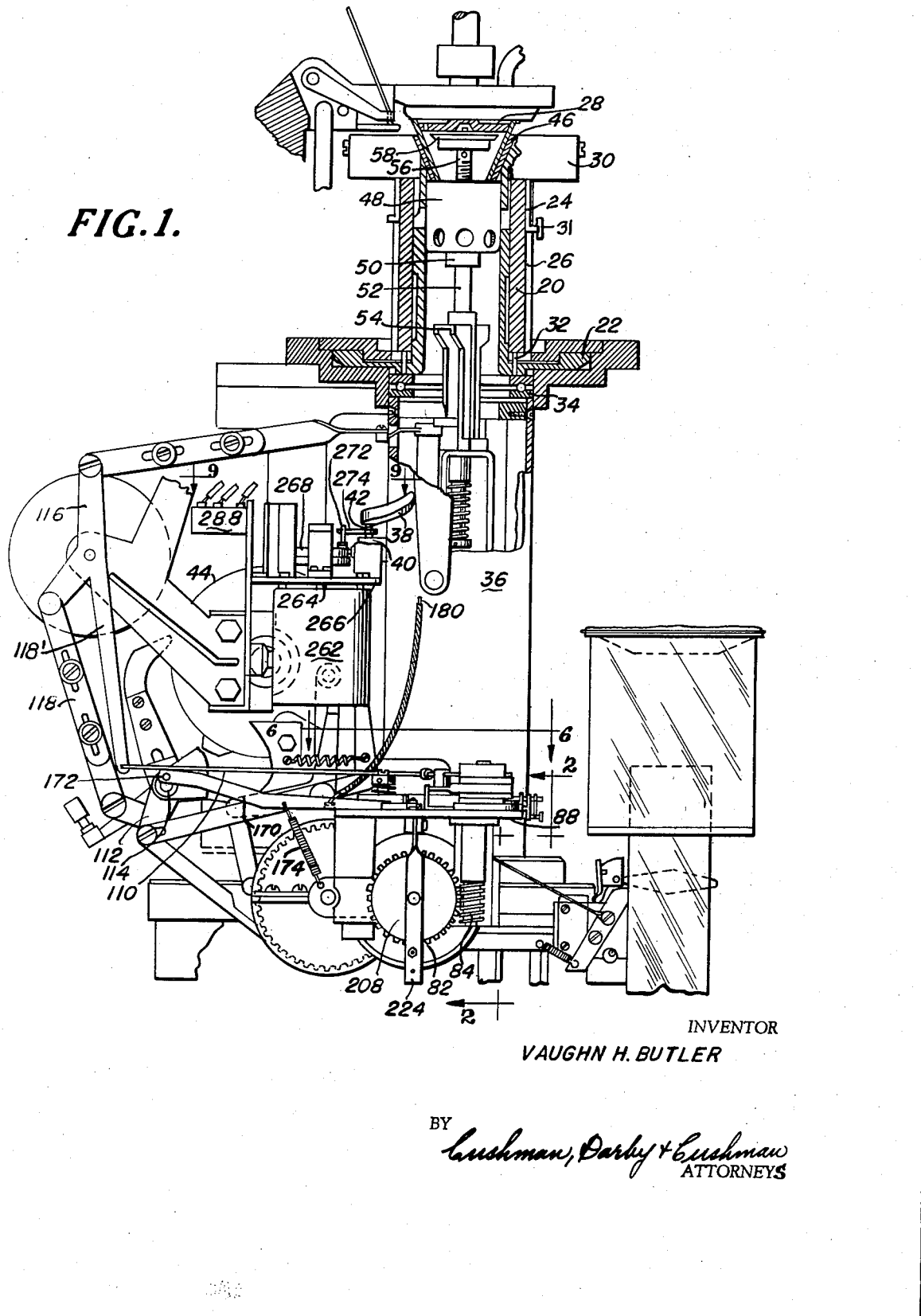
Figure 1 is an elevational view, partly broken away, of the upper section of an exemplary circular knitting machine, which for the purpose of illustration corresponds to a Scott and Williams Model KN. This machine is provided with an automatic draw-off device of the type previously referred to, and specifically illustrated and described in Lawson Patent No. 2,625,026.

Referring to the drawings in detail, in Figure 1 is illustrated a conventional circular knitting machine including the usual rotary needle cylinder 20 mounted for limited vertical axial movement on the driving bevel gear 22. The knitting cylinder carries the usual needles 24 in its slots 26, and is surmounted by the rotary dial 28 and sinker cap 30. The needles 24 are actuated, as is well known, by the needle cams 31. The cylinder is supported through pins 32 and anti-friction bearing 34 by the non-rotating column 36. A bracket 38 extends laterally from the column, and is supported by an arm 40 through the customary adjustment screw 42. Arm 40, it will be understood, is actuated by the conventional pattern control mechanism of the machine, as by cams on the main cam drum 44, and controls the axial movement of the column and cylinder whereby the length of the stitches being drawn by the needles is varied and controlled throughout the knitting cycle, in the well known manner. The adjustment screw 42 is relatively coarse threaded, and is provided and utilized customarily to bring other adjustment screws within their limits, in periodic setup of the machine. That is, the screw 42 is not adjusted during operation.

As illustrated, the machine is equipped with an automatic draw-off mechanism of the type described in detail in Lawson Patent Number 2,625,026. This mechanism includes a cylindrical element 46 positioned within the sinker ring of the machine and a cup 48 carried by a bearing 50 mounted atop the tube 52 which extends through the vertically slidable carriage 54. A rod 56 extending upwardly from the carriage through tube 52 carries at its upper end a rotatable clamp member 58. From the carriage a cable 60 runs upwardly over a pulley (not shown) mounted on the column 36 and then downwardly to the winding drum 62, to which it is secured. The winding drum is mounted on a shaft 64, which also mounts an auxiliary drum 66, on which a cable 68 is wound reversely with respect to cable 60. The cable 68 carries on its free end a counterweight 70.

Figure 2:
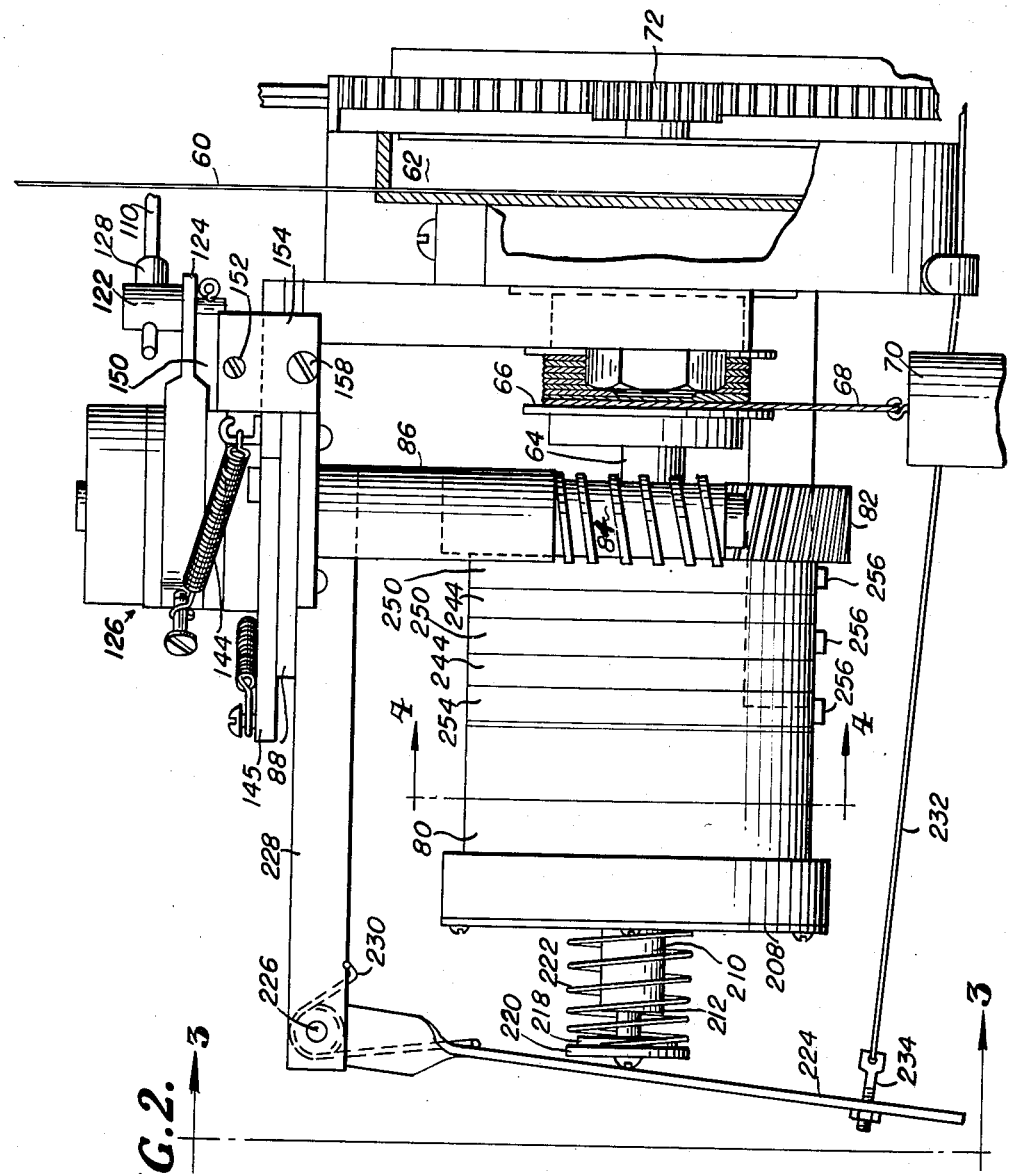
Figure 2 is an elevational view, on enlarged scale, taken substantially along the line 2—2 of Figure 1, illustrating the detecting mechanism of my invention.

At the end of each cycle, that is after the knitting of a stocking has been completed, the carriage 54 is elevated to the top position and relationship illustrated, with clamp 58 separated and spaced from cup 48. This may be accomplished by means of the gear 72 fixed to shaft 64 (see Figure 2), driving of the shaft 64 in proper direction being effective, it will be understood, to wind the cable 60 on drum 62 and thereby elevate the carriage. The carriage and associated clamp mechanism may attain this position and relationship approximately at the beginning of a new cycle, that is when the knitting of the welt of a new stocking begins, or shortly thereafter.

The new cycle then proceeds with knitting of the stocking welt until the fabric reaches and enters the cup 48, whereupon the clamp 58 is moved against the cup to firmly clamp the fabric therebetween, entirely and evenly about the periphery of the fabric. The carriage and clamping mechanism are then released from support and depend freely from the fabric, this condition persisting throughout the remainder of knitting operation, whereby the carriage and clamp mechanism function as a dead weight applying constant and uniform tension to the stocking as it is knitted.

When the cable 60 is wound onto drum 62 and the carriage is elevated, the cable 68 is unwound by counterweight 70. As the carriage and clamp mechanism descend with the stocking welt, the cable 60 unwinds from drum 62, cable 68 and counterweight 70 functioning to keep the cable 60 taut. In the operation of draw-off devices of this type, it will be observed that the downward movement of the carriage with the fabric is at a rate precisely equal to the rate of fabric production, and directly proportional to the length of stitch loops being produced at any time. The same is true of the movement of cable 60, and the unwinding rotation of drum 62 and its shaft 64 are similarly directly proportional to the rate of fabric production. Any of these movements, then, offers an absolute index of the performance of the machine from the viewpoint of stitch loop length, and may be utilized in accordance with my invention to maintain constant and uniform stitch length through all or the most critical parts of the knitting cycle.

My invention comprises essentially a detecting mechanism and a correcting mechanism. The detecting mechanism is best illustrated in Figures 2, 3, 4 and 5, and comprises a rotary detection cylinder 80 driven through the attached gear 82 by a worm 84 formed in the lower end of a vertical shaft 86, which is journaled and supported in a horizontal frame mounted plate 88. In the exemplary embodiment illustrated, the detection cylinder is mounted by means of anti-friction bearings 90 on an extension 92 of the drum shaft 64. Adjacent its outer end, the shaft extension 92 carries a generally cylindrical block 94 of insulating material, in which is mounted a detector switch 96. The switch 96 is supported in the block by a pivot pin 98, and extends therefrom in generally radial direction. The outer end of the switch is enclosed by a friction cap 100 loaded by spring 102, which bears on and frictionally engages the inner surface of the detection cylinder.

The shaft extension 92, block 94 and its detector switch 96 are adapted to be rotated, as will be evident, at a rate directly proportional to the actual rate of fabric production. Provision is made to rotate the detection cylinder 80 by means of the knitting machine drive, so that its rotational speed will be proportional to the speed of the machine and thereby to the rate at which the fabric should be produced, barring extraneous variable factors. Accordingly, any relative movement between the block 94 and the detection cylinder 80 will indicate undesired variation from the designed rate of fabric production, or from the planned regularity of courses. This relative movement is utilized to introduce a factor of correction which compensates the undesired variation and thereby maintains the planned regularity of courses.

The detection cylinder drive may be understood by reference to Figures 1, 6, 7 and 8, and is derived from a rod 110 longitudinally reciprocated in any suitable manner by the machine drive. In the knitting machine shown (see Figure 1), an arm 112 extends from shaft 114 which is oscillated during operation through a link connection to the usual oscillating quadrant (not shown). Arm 112 oscillates the bell crank 116 through link 118, and the bell crank is utilized to oscillate a track of the carriage 54, to preclude frictional binding of the carriage in its downward movement. Conveniently, a generally downwardly extending arm 118' may be fixed to the bell crank 116, as by welding, and its outer end engaged to and utilized to reciprocate the rod 110.

The other end of the rod 110 extends slidably through the bore 120 of a post 122, which is pivotally mounted in the outer end of a horizontally disposed drive arm 124 of the one-way clutch indicated generally as 126. The rod 110 carries an adjustable stop 128, which serves to impart driving movements to the clutch drive arm 124.

Figure 6:
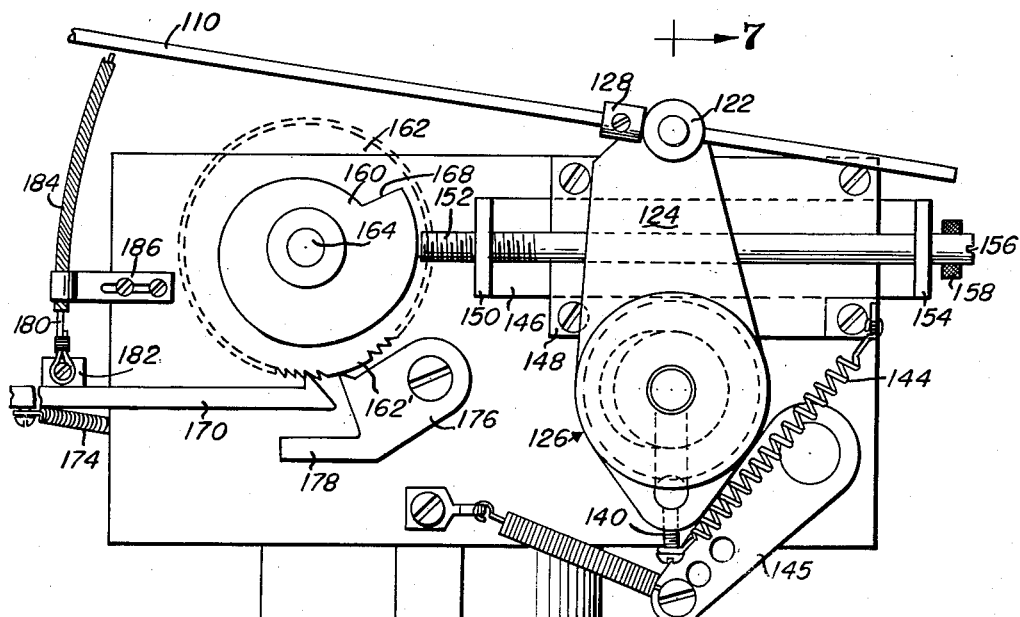
Figure 6 is a plan view, on enlarged scale, taken on the line 6—6 of Figure 1, showing the knitting machine drive to the detecting mechanism.
Figures 7, 8:
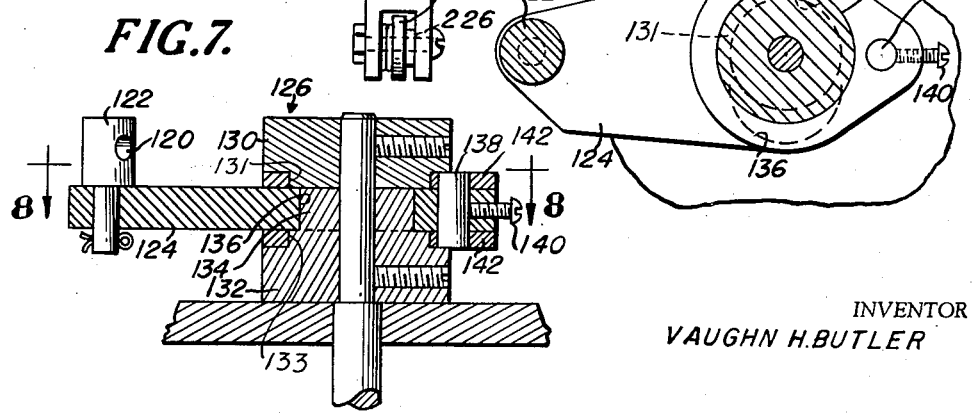
Figure 7 is a sectional view taken on the line 7—7 of Figure 6.
Figure 8 is a sectional view taken on the line 8—8 of Figure 7.

The upper end of vertical shaft 86 extends through plate 88, and is fixedly engaged by the clutch elements 130 and 132. The lower clutch element 132 comprises a reduced annular section 134 which is enclosed by the oval slot 136 of the clutch drive arm 124. As best shown in Figure 7, the inner end of the clutch arm 124 carries a pin 138 which pivotally engages the clutch rings 142. A heavy spring 144 extending from screw 140 mounted in the clutch arm to the plate 88 tends to move the clutch arm 124 in counterclockwise direction as viewed in Figure 6, and maintain the post 122 in contact with the rod stop 128. The clutch is effective to transmit to the worm shaft 86 driving movements of the arm 124 in clockwise direction as viewed in Figure 6, but not return counterclockwise movements. The axes of post 122, pin 138 and the axis of curvature of slot end surface 137 are substantially coplanar, the longitudinal axis of the slot 136 being approximately normal to this plane. Accordingly, clockwise movement of the clutch arm tends to rotate it about pin 138, resulting in movement of the clutch arm with respect to reduced section 134 until the clutch arm slot binds upon the reduced section 134. The same action tneds to displace pin 138 away from the axis of clutch elements 130 and 132, and accordingly cams the clutch rings 142 in the direction of pin 138, whereby they bind upon the reduced sections 131 and 133 of the clutch elements 130 and 132. Counterclockwise movement of the clutch arm is effective to displace the reduced section 134 of the clutch elements 132 toward the slot end surface 137, which frees the clutch arm slot on the reduced section 134 and permits free relative rotation therebetween. Relative movement of the reduced section 134 toward the slot end surface 137 also tends to displace pins 138 inwardly, toward the axis of the clutch elements 130 and 132, whereupon the clutch rings 142 are centered with respect to the reduced sections 131 and 133, and free relative rotation therebetween is permitted. By adjustment of the stop 128 on rod 110, the clutch is capable of adjustment with infinite fineness. A spring biased friction brake 145 may engage the clutch to smooth its action.

Below the clutch drive arm 124 the plate 88 carries a slide 146 which is slidably mounted in a suitable guideway 148. One end portion 150 of the slide 146 is upwardly turned and extends into the path of the clutch drive arm, to act as a limiting stop therefor. An adjustment rod 152 is threadably engaged to the slide end portion 150, and extends freely through a suitably aligned opening in the T member 154 at the opposite end of the slide. The unthreaded end of the adjustment rod 152 may conveniently be slotted as at 156, to facilitate adjustment thereof. The lower end of the slide T member 154 carries an adjustment screw 158, adapted to bear against or engage the plate 88 and thereby limit the relative position of the slide.

The inner end of rod 152 is rounded, and bears radially on the periphery of cam 160, which, with its driving ratchet wheel 162, is mounted on the stub shaft 164 extending upwardly from plate 88. A spring 166 engaged to both stub shaft 164 and cam 160 tends to turn the cam and its ratchet wheel in counterclockwise direction as viewed in Figure 6.

A ratchet arm 170 engaged to the end of shaft 114 by an eccentrically mounted pin 172 is reciprocated by the oscillation of shaft 114, and its operative end is constrained to ride on the upper surface of plate 88 in suitable manner, as by the downwardly extending spring 174. A holding pawl 176 is mounted on plate 88 adjacent the end of ratchet arm 170, and spring biased toward the ratchet wheel 162 in common manner. The holding pawl is provided with a laterally extending lug 178, which roughly parallels the reciprocation of the ratchet arm 170. A Bowden wire 180 is fixed at 182 to the ratchet arm intermediate its length, and its sheath 184 is positioned and retained by clip 186 mounted on plate 88, the Bowden wire being disposed to move the ratchet arm 170 radially inwardly and outwardly with respect to ratchet wheel 162. The other end of the Bowden wire 180 may be actuated by the main cam drum of the machine in conventional manner, to move the ratchet arm 170 at appropriate points in the knitting cycle, as will hereinafter be described.

Figure 5:
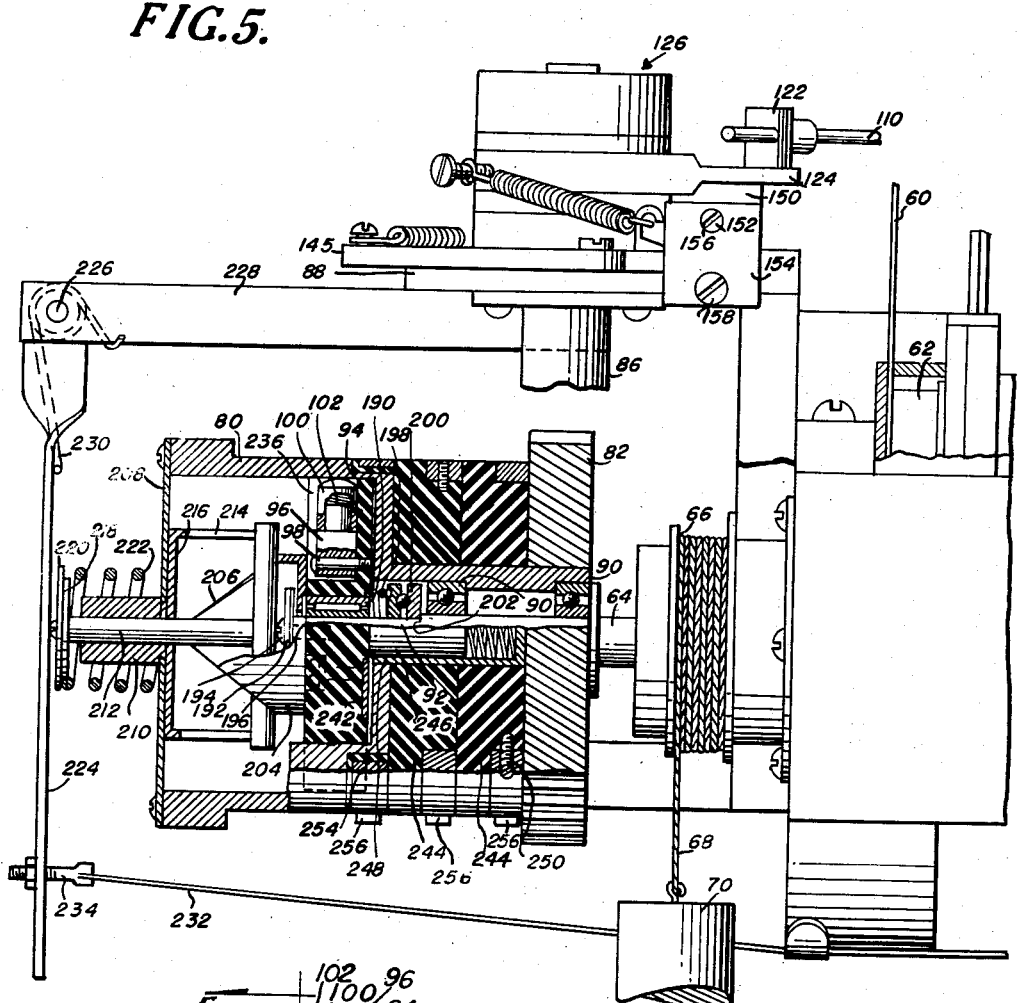
Figure 5 is a view corresponding to Figure 2, but illustrating the detecting mechanism as sectioned along the line 5—5 of Figure 4.

Referring in greater detail to the detector mechanism, and in particular to Figure 5, the block 94 is supported by the shaft extension 92 through a needle bearing 190. A disc 192 is secured to the end of shaft extension 92 as by a screw 194, and carries on its inner surface a clutch washer 196. The block 94 is biased toward the clutch washer 196 by spring 198, bearing through thrust bearing 200 on the shaft shoulder 202. The block also has mounted thereon an axially aligned and outwardly extending cylindrical member 204, provided with oppositely disposed V notches 206.

The outer end of the detection cylinder is closed by a plate 208, which supports a bushing 210 axially aligned with the shaft extension 92. The tail of a T member 212 is slidably mounted in bushing 210, and its arms are prevented from relative rotation by guides 214 extending from a bracket 216 fixed to the inner surface of plate 208. The outer end of the T member tail is provided with a spring retainer 218 and disc 220, and a spring 222 is disposed between plate 208 and the disc 220 to maintain the disc and the associated T member normally in outermost position.

When the T member is in normal outermost position, the spring 198 forces the member 204 into contact with the clutch washer 196, whereby the block 94 is frictionally engaged to the drum shaft extension 92. The T member is engageable only with the outermost portions of the V notches 206 of cylindrical member 204, whereby the block 94 may rotate relative to the detection cylinder approximately 90° in either direction. Greater relative movement would be absorbed by the clutch washer 196 without damage, but does not occur in normal operation. When desired, the switch block 94 may be cammed to predetermined angular relationship with respect to the detection cylinder, and disengaged from the drum shaft extension, by inward movement of the T member. In such inward movement, the arms of the T member engage V notches 206 and rotate the cylindrical member 204 and the associated block until the T member arms seat at the bottoms of the notches, and thereafter displace the member 204 and the block 94 inwardly against spring 198, separating member 204 from the clutch washer 196. The block 94 is in this manner aligned with and effectively engaged to the detection cylinder as well as disengaged from the drum shaft extension. Disengagement from the drum shaft extension is effective to deactivate the detecting mechanism, and facilitates elevation of the carriage 54, which necessitates considerable relative movement between the winding drum shaft and the detection cylinder.

To displace the T member 212 inwardly at appropriate points in the machine cycle, a lever 224 is pivotally mounted at 226 to a bracket 228 extending outwardly from the underside of plate 88, the lever extending downwardly in general alignment with disc 220. A string 230 is provided to maintain the lever 224 normally in the outward position illustrated in Figure 2. A Bowden wire or cable 232 secured to the free end of lever 224 by means of adjustment screw 234 is adapted to displace the lever inwardly, and may be controlled in conventional manner by the chain or the main cam drum of the machine.

Referring again to the internal construction of the detection cylinder, the block 94 is provided with a radial channel 236 in which is mounted the detector switch 96. The detector switch is provided with side contacts 238, adapted alternatively to engage one or the other of the contacts 240 fixed in the block. The fixed contacts 240 are connected by suitable conductors to contact sectors 242 set into the inner surface of the block.

The inner end of the detector cylinder is reduced in diameter, and carries thereon inside gear 82 a pair of cylindrical insulating blocks 244. The blocks mount two spring pressed carbon brushes 246 disposed in general alignment with the shaft extension 92, the brushes being however on opposite sides thereof (see Figure 4). Each brush through its conducting case 248 is in electrical contact with a slip ring 250 set into the peripheries of the blocks, as by a copper pin (not shown) extending inwardly from the slip ring through the block to the associated brush case. As will be evident, relative rotation of the block 94 with respect to the detector cylinder will bring one contact sector 242 or the other, and its connected contact 240, into electrical engagement with one of the carbon brushes 246, and its connected slip ring 250. The detector switch 96 is connected by a suitable conductor 252 to the detection cylinder or to a slip ring 254 set into the periphery thereof, and spring brushes 256 may be mounted in wiping contact with the slip rings 250 and 254.

The corrective mechanism of my invention is illustrated in Figures 1 and 9, and includes a reversible reducing gear head shaded pole motor 262 mounted on the machine frame. The motor shaft 264 extends upwardly through plate 266 and drives the disc 268 positioned thereabove. As shown in Figure 9 disc 268 is provided with a pin 270, by which it may be engaged to a link 272, the other end of which is loosely engaged to an arm 274 fixedly extending from the adjustment screw 42 of the device. Rotation of the disc 268 in either direction from that illustrated in Figure 9, then, will be effective to turn the adjustment screw 42 and make a corrective adjustment in the vertical position of the needle cylinder, and it is this mechanical connection which I utilize to attain the objects of the invention.

The disc 268 is provided with a peripheral notch 276 adapted to seat the feelers alternatively of a centering switch 278 or either of the limit switches 280 and 282. The disc 268 is also provided with a peripheral groove 284 which extends from a position offset approximately 90° from notch 276 to a position approximately directly opposite notch 276. The groove 284 is adapted to seat the feeler of a two position aligning switch 286. The electrical system (see Figure 10) also includes a triple blade gang switch 288, which may conveniently be mounted on plate 266, and an inertia switch 290 series connected in the power circuit and adapted to inactivate the electrical system when the machine is stopped for any reason. The gang switch may be actuated by the machine chain, or by a suitable linkage, cable or the like under the control of a cam on the main cam drum of the machine.

Operation of the invention will now be described in detail. The machine starts the knitting cycle in usual manner, from bare needles, knitting the welt of a stocking first. During this initial stage of the cycle, the lever 224 is maintained by cable 232 in the inward position illustrated in Figure 5, whereby the detecting mechanism is inactivated. The detection cylinder 80 is turned at predetermined rate with respect to the knitting, by reason of the reciprocation of rod 110, the action of one way clutch 126, and the resulting step-by-step rotation of shaft 86, its worm 84, and the engaged detection cylinder gear 82. By reason of the inward position of T member 212, the block 94 is disengaged from drum shaft extension 92, is centered with respect to the detection cylinder, and turning with it. The correcting mechanism is initially centered and inactive, the disc 268 being in the position illustrated in Figure 9, with the feeler of centering switch 278 in notch 276 and the link 272 maintaining arm 274 and the adjustment screw 42 in median position. Gang switch 288 is in position opposite to that illustrated in Figure 10, and the inertia switch 290 is of course closed while the machine is running. Ratchet arm 170 is maintained out of engagement with the cam ratchet wheel 162 by Bowden wire 180, and in contact with the holding pawl lug 178 so as to disengage also the holding pawl. The adjustment rod 152 bears upon or approaches the low part of cam 160, and the cam spring 166 maintains the cam shoulder 168 in contact with the adjustment rod 152. If desired, a suitable stop may be built into the cam ratchet wheel to limit the cam position so that its shoulder is generally parallel to and adjacent the adjustment rod.

Knitting of the stocking welt proceeds until the welt enters within the carriage cup 48 and is engaged thereto by clamp member 58. Thereafter, as previously indicated, the carriage rides freely on the fabric as it is knitted, and maintains constant and uniform tension thereon. As the carriage descends with the welt end of the stocking, the cable 60 unwinds from its drum 62, turning the drum shaft 64 at a rate directly proportional to the rate of fabric production.

When the knee or after welt has been completed, the main drum of the machine shifts to start the leg knitting. This shift is utilized, in the preferred embodiment, to release the lever 224 and to actuate gang switch 288 to the position illustrated in Figure 10. This action is effective to activate both the detecting mechanism and correcting mechanism of the invention.

Release of lever 244 by its cable 232 permits the lever to move outwardly under the impetus of spring 230, and the T member 212 to move outwardly under the impetus of its spring 222. Movement of the T member disengages its arms from the bottoms of V notches 206, and permits spring 198 to force block 94 into contact with clutch washer 196, whereby the block 94 is frictionally engaged to drum shaft extension 92. The block and its detector switch 96 then turn with the drum shaft 64, at a rate proportional to the rate of fabric production, whereas the detection cylinder continues to turn at a predetermined rate with respect to the machine drive. So long as the block and the detection cylinder rotate at equal speeds, nothing more occurs, the adjustment screw arm 274 remains stationary, and the length control of the stocking being knitted is effected only by the conventional pattern control means of the machine.

Figure 4:
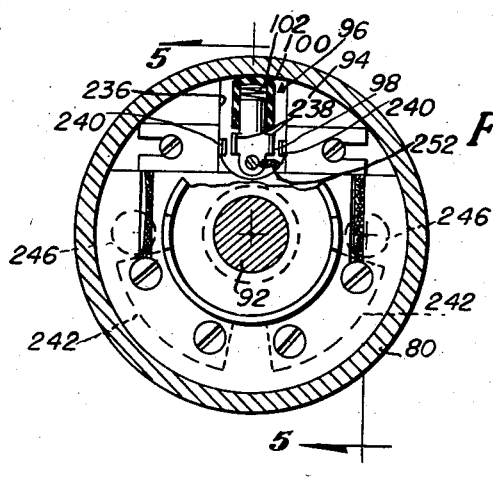
Figure 4 is a sectional view of the detecting mechanism, taken substantially on the line 4—4 of Figure 2.

In the event the stitch loop length decreases from the predetermined standard by reason of some extraneous factor, such as an increase in drag of the yarn being fed to the machine, the length of the courses being knit would automatically change and the descent of the carriage 54 would be relatively slowed, resulting in a reduction in the rate of turn of shaft 64. Block 94 would then turn at a rate slower than that of the detection cylinder, and would move relatively thereto in clockwise direction as shown in Figure 4. The detector switch 96, by frictional engagement by its cap 100 to the detection cylinder, would thereupon pivot about its pin 98 in counterclockwise direction as shown in Figure 4, and its left-hand contact 238 would contact the left-hand fixed contact 240. At the same time left-hand block sector contact 242 would rotate into contact with the left-hand detection cylinder brush 246, to complete a circuit to the correcting mechanism motor 262.

Referring to Figure 10, it will be seen that when switch 96 is moved to engage the contact indicated as 240L, a circuit is completed through inertia switch 290, the lower blade of gang switch 288, motor 262, coil L thereof, normally closed limit switch 282, the upper blade of gang switch 288 and detector switch 96. The circuit through the coil L of the motor is effective to cause the motor shaft and disc 268 to rotate in clockwise direction, thereby (see Figure 9) through link 272 rotating arm 274 and adjustment screw 42 in counterclockwise direction as shown, to slowly elevate the knitting cylinder to correct for the shortening of the loop length. This movement of disc 268 and the adjustment screw arm 274 will continue until the rotary movement of block 94 equals and exceeds that of the detection cylinder, whereupon the left-hand contact 238 of detector switch 96 will separate from the left-hand block contact 240 to open the circuit and terminate the corrective adjustment. A slight overcorrection is thereby introduced, which partially compensates for the temporary shortening. The detector switch may pivot further until its right-hand contact 238 engages the right-hand block contact 240, but no circuit may be completed therethrough until the block has passed the centered position of Figure 4 and the right-hand brush 246 is riding the right-hand block sector 242.

If the length of the knitted courses should increase relative to the predetermined standard, as might occur if the yarn should suddenly run loose, the rate of fabric production and the rate of descent of the carriage 54 would be relatively increased. In such case, the block 94 would turn faster than the detection cylinder, in counterclockwise direction relative thereto as viewed in Figure 4. This relative movement would cause the detector switch 96 to trail on its pivot 98, that is to pivot thereabout in clockwise direction. Such pivoting action of the detector switch would bring its right-hand contact 238 into engagement with the right-hand block contact 240, and at the same time the relative rotation of the block would bring its right-hand sector 242 into contact with the right-hand detection cylinder brush 246, completing another circuit through the correcting mechanism motor 262.

Referring again to Figure 10, it will be evident that movement of detector switch 96 to engage contact 240R completes a circuit through inertia switch 299, the lower blade of gang switch 288, motor 262, coil R thereof, normally closed limit switch 280, the center blade of gang switch 288 and detector switch 96. This circuit through the coil R of the motor is effective to rotate the motor shaft and disc 268 in counterclockwise direction as viewed in Figures 9 and 10. This movement of disc 268 is effective through link 272 to rotate arm 274 and adjustment screw 42 in clockwise direction, thereby lowering the knitting cylinder to shorten the length of the courses being knitted. The knitting cylinder will be progressively lowered in this manner until the rotary movement of block 94 decreases to a rate below that of the detection cylinder, that is until the length of the courses being knit again corresponds substantially to the predetermined standard, whereupon switch 96 will be opened as previously described.

Disc 268 is limited in its rotation by its notch 276 and limit switches 280 and 282 to about 60° in either direction. It will be readily seen that in the event notch 276 moves toward and reaches the position of either limit switch, it will permit the normally closed limit switch to open and thereby break the correcting circuit therethrough. Limitation of the rotation of disc 268 to an overall arch of 120° is of course purely arbitrary. The limit switches are desirably disposed in such relationship as to prevent damage to the mechanism, and under normal conditions of operation never function. In the manner above described, the detecting mechanism and the correcting mechanism function together to offset factors which would alter the actual rate of draw-off, and maintain the rate of fabric production constant and at the predetermined standard established by the pattern control means of the machine.

When the machine changes from leg knitting to ankle knitting, pattern control is taken over by the conventional graduating cam, by which the length of the courses is gradually reduced to make the stockings smaller in the ankle. For example, a graduating cam may function to lower the needle cylinder a predetermined small distance after each four courses of the stocking. In order to utilize the present invention during this transitional stage of the cycle, the drive ratio between the knitting cylinder and the detection cylinder must be correspondingly and progressively changed. This is accomplished by the mechanism best illustrated in Figure 6.

During the leg knitting of the machine, the clutch arm 124 is moved, for example, through an arc of about 80° once during each four revolutions of the knitting cylinder, establishing a drive ratio between knitting cylinder and detection cylinder of about 450 to 1. To match the operation of the graduating cam, it is necessary to reduce this arc of movement progressively from 80° to about 68°, to thereby change the drive ratio to about 525 to 1. To accomplish this, in the illustrative embodiment Bowden wire 180 is moved by the shift in pattern control to angle knitting to move ratchet arm 170 into engagement with the ratchet wheel 162 of cam 160. This movement permits the holding pawl 176 to also engage the ratchet wheel. In the course of the ankle knitting, then, longitudinal reciprocation of ratchet arm 170 is effective to rotate cam 160 in clockwise direction as shown in Figure 6. In the illustrative embodiment, the outer cam surface of cam 160 starting at shoulder 168 rises at constant rate through 320°, and then remains circular for the remaining 40° to the shoulder. The rotation of the cam through 320° progressively displaces rod 152 and its supporting slide 146 to the right as shown. End portion 150 of the slide limits the counterclockwise return movement of the clutch arm 124, and through the displacement of rod 152 progressively to a greater and greater degree, until when the rod 152 is riding on the high and circular portion of the cam, slide end portion 150 limits the clutch drive arm movement to an arc of about 68°. In this manner, the actual rate of fabric production is correlated with the predetermined standard of fabric production throughout the transitional period of change effected by the graduating cam, any variations due to extraneous factors being compensated by the detecting and correcting mechanisms. The final drive ratio of about 525 to 1 is correct for the knitting of the ankle proper and foot of the stocking. Accordingly, when the cam 160 has turned somewhat more than 320°, or to the approximate position shown in Figure 6, the holding pawl 176 works freely on flat 162' of the ratchet wheel, and further reciprocation of the ratchet arm 170 does not effect further rotation of the cam. The spring 174, of course, is stressed in the cam rotation.

To maintain product uniformity it is desirable that disc 268 be in centered position during the knitting of the heel and toe of the stocking, so that the adjusting screw 42 will be held in median position during these stages of the cycle. For this purpose, and to provide time for the centering action, a few courses before heel knitting begins gang switch 288 is actuated from the position illustrated in Figure 10 to opposite position, disconnecting the correcting mechanism from the detecting mechanism and placing the motor 262 under control of the centering switch 278 and aligning switch 286. If at the moment gang switch 288 is actuated disc 268 happens to be centered, in which case the feeler of centering switch 278 would extend into disc notch 276 and the centering switch would be open, motor 262 is not energized. If, however, disc 268 is not centered, a suitable motor circuit through centering switch 278 and aligning switch 286 effects rotation of the motor 262 in proper direction to center the disc.

Again referring to Figure 10, it will be seen that if disc 268 is displaced clockwise from center position, the plunger of switch 286 will be forced in and riding the periphery of the disc, in which case a circuit will be completed through inertia switch 290, the lower blade of gang switch 288, the now closed centering switch 278, motor 262, coil L thereof, limit switch 280, the center blade of gang switch 288 and the aligning switch 286. This circuit causes the motor to turn the disc in counterclockwise direction until centering switch 278 is opened by notch 276, whereupon the motor comes to rest with the disc in centered position. If the disc happens to be displaced counterclockwise from center position when gang switch 288 is actuated, the plunger of aligning switch 286 will extend into disc groove 284, completing a circuit through inertia switch 290, the lower blade of gang switch 288, centering switch 278, motor 262, coil R thereof, limit switch 282, the upper blade of gang switch 288 and the aligning switch, which circuit will energize the motor to rotate in proper direction to move the disc clockwise, until its notch 276 reaches center position and opens switch 278. In this manner, actuation of gang switch 288 is effective always to promptly return disc 268 and the connected adjusting screw arm 274 to centered or neutral position, and this relationship persists throughout the heel knitting.

As the machine goes into the heel knitting, or at any time after gang switch 288 has disconnected the correcting mechanism therefrom, the detecting mechanism is inactivated by action of cable 232 to displace lever 224 inwardly to the position of Figure 5, returning the detector mechanism to the condition initially described wherein the block 94 and its detector switch are disengaged from the drum shaft. This condition is maintained until knitting of the heel has been completed and preferably until several courses have been knitted in the foot portion of the stocking, to insure that conditions have stabilized after knitting the heel pocket, whereupon cable 232 permits lever 224 to return to the position of Figure 2, and gang switch 288 is actuated to the position of Figure 10. The detecting mechanism is again activated at this point, accordingly, and the correcting mechanism motor circuits returned to its control. The detecting and correcting mechanisms function substantially throughout the knitting of the foot portion in the manner previously described, to insure uniform length thereof, the drive ratio between knitting cylinder and detecting cylinder remaining at about 525 to 1. As the machine approaches the ring toe, gang switch 288 is again moved from the Figure 10 position to opposite position, whereupon motor 262 again centers disc 268 as already described, and the disc 268 and adjusting screw arm 274 remain in centered position to the end of the cycle, and until leg knitting of the next stocking is started.

As the machine enters the toe knitting, or concurrently with actuation of the gang switch, cable 232 again moves lever 224 inwardly, deactivating the detecting mechanism for the remainder of the cycle and until leg knitting of the next stocking begins. The periods of activation of the detecting and correcting mechanisms may be altered as desired, although the above described sequence is preferred.

When the stocking is completed, it is dropped from the needles, released by the carriage clamp mechanism, and then discharged by compressed air, all in well-known manner. At the end of the cycle, or at any time after completion of the foot portion of the stocking, the Bowden wire 180 is extended to displace ratchet arm 170 radially outwardly from cam ratchet wheel 162. In its outward movement the ratchet arm engages lug 178 of holding pawl 176, and disengages the holding pawl also from the cam ratchet wheel, permitting the cam spring 166 to rotate cam 160 and its ratchet wheel in counterclockwise direction, until the cam shoulder 168 strikes the adjustment rod 152, which meanwhile moves inwardly toward the cam. In this way, the cam shoulder 168 may function as a stop to position the cam for the next cycle. As previously indicated, other suitable stop means may be provided if desired.

As will be evident, the invention is capable of numerous adjustments to achieve optimum operation, and to adapt it for operation with different machine settings. The drive of one way clutch 126 may be varied by adjustment of the stop 128 on rod 110, and its controlled variation altered by adjustment of rod 152 or screw 158. Rod 152 may serve for rough adjustment, and screw 158 for fine adjustment. The gearing of motor 262 may be altered if necessary, and other adjustments will be obvious.

In operation my invention has proved successful in making successive stockings of excellent quality and uniform length, unaffected by any operational conditions usually encountered in a knitting mill. The invention is conveniently applied to standard knitting machines, and as will be obvious may be used with circular knitting machines of types other than that shown for the purpose of illustration. For example, the invention may be applied by adjusting the relative vertical position of the cam box, particularly in machines having axially adjustable cam boxes and axially stationary needle cylinders. The invention has particular utility with multiple feed machines, and in the knitting of stretch fabrics thereon.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A circular knitting machine comprising a rotary needle cylinder, needle cams cooperative with said needle cylinder, a member movable at a rate proportional to actual fabric production, a member movable at a predetermined rate relative to the rotation of the needle cylinder, and means operative to effect relative axial movement between said needle cylinder and said needle cams in accordance with differential movements between said members.

2. A circular knitting machine comprising a rotary needle cylinder mounted for axial movement, a member movable at a rate proportional to actual fabric production, a member movable at a predetermined rate relative to the rotation of the needle cylinder, and means operative to axially displace the needle cylinder in accordance with differential movements between said members.

3. A circular knitting machine comprising a rotary needle cylinder mounted for axial movement, pattern control means for axially adjusting the cylinder during the course of a knitting cycle, a member movable at a rate proportional to actual fabric production, a member movable at a predetermined rate relative to the rotation of the needle cylinder, and means operative to introduce an adjustment between said needle cylinder and said pattern control means in accordance with differential movements between said members.

4. A circular knitting machine comprising an axially movable column and a rotary needle cylinder supported thereby, pattern control means for axially moving the column during the course of a knitting cycle, an adjustment mechanism between said pattern control means and said column, a member movable at a rate proportional to actual fabric production, a member movable at a predetermined rate relative to the rotation of the needle cylinder, and means operative to actuate said adjustment mechanism in accordance with differential movements between said members.

5. A circular knitting machine comprising an axially movable column and a rotary needle cylinder supported thereby, cam means controlling the axial movement of said column, an adjustment mechanism between said cam means and said column, a weight engageable to and movable with the fabric being knitted, a first member movable in accordance with the movement of said weight, a second member movable at a predetermined rate relative to the rotation of the needle cylinder, and means operative to actuate said adjustment mechanism in accordance with differential movements between said members.

6. A circular knitting machine as defined in claim 5, including means operative to disengage said first member from said weight during preselected portions of the knitting cycle.

7. A circular knitting machine as defined in claim 5, including means to vary the relative rate of movement of said second member during a preselected portion of the knitting cycle.

8. A circular knitting machine comprising an axially movable column and a rotary needle cylinder supported thereby, pattern control means for axially moving the column during the course of a knitting cycle, means for driving said needle cylinder, an adjustment mechanism interposed between said pattern control means and said column, a weight engageable to and freely movable with the fabric being knitted, a first member movable in accordance with the movement of said weight, a second member connected to be driven at predetermined relative rate by said needle cylinder drive, said driving connection to said second member including a one way clutch, and means operative to actuate said adjustment mechanism in accordance with differential movements between said members.

9. A circular knitting machine as defined in claim 8, including means to vary the relative rate of movement of said second member during a portion of the knitting cycle.

10. A circular knitting machine as defined in claim 8, including means actuated by the pattern control means to progressively vary the operative stroke of said one way clutch during the graduated ankle portion of the knitting cycle.

11. A circular knitting machine as defined in claim 8, wherein said means varying the operative stroke of said one way clutch includes a stop and a rotary cam mounted to displace said stop.

12. A circular knitting machine comprising an axially movable column and a rotary needle cylinder supported thereby, pattern control means for axially moving the column during the course of a knitting cycle, an adjusting screw interposed between said pattern control means and said column, a weight engageable to and movable with the fabric being knitted, a first member movable in accordance with the movement of said weight, a second member movable at a predetermined rate relative to the rotation of the needle cylinder, and means operative to turn said adjusting screw in accordance with differential movements between said members.

13. A circular knitting machine comprising an axially movable column and a rotary needle cylinder supported thereby, pattern control means for axially moving the column during the course of a knitting cycle, an adjusting mechanism interposed between said pattern control means and said column, a weight engageable to and freely movable with the fabric being knitted, a first member movable in accordance with the movement of said weight, a second member movable at a predetermined rate relative to the rotation of the needle cylinder, a rotary element, a link engaging said rotary element to said adjusting mechanism whereby rotation of said rotary element effects movement of said adjusting mechanism, a reversible motor driving said rotary element, and means for closing alternate correcting circuits through said motor in accordance with differential movements between said members.

14. A circular knitting machine as defined in claim 13, including means actuated by said pattern control means operative to simultaneously open said correcting circuits and center said rotary element.

15. A circular knitting machine as defined in claim 13, including means limiting the rotational movement of said rotary element.

16. A circular knitting machine comprising an axially movable column and a rotary needle cylinder supported thereby, pattern control means for axially moving the column during the course of a knitting cycle, an adjusting mechanism interposed between said pattern control means and said column, a weight engageable to and freely movable with the fabric being knitted, a first member movable in accordance with the movement of said weight, a second member movable at a predetermined rate relative to the rotation of the needle cylinder, a rotatably mounted disc, a link engaging said disc to said adjusting mechanism whereby rotation of said disc effects movement of said adjusting mechanism, a reversible motor driving said disc, means for closing alternate correcting circuits through said motor in accordance with differential movements between said members, a centering switch adjoining said disc, a notch in said disc normally aligned with said centering switch, and means actuated by said pattern control means operative to simultaneously open said correcting circuits and to rotate said disc to bring its notch into alignment with said centering switch.

17. A circular knitting machine comprising an axially movable column and a rotary needle cylinder supported thereby, pattern control means for axially moving the column during the course of a knitting cycle, an adjusting mechanism interposed between said pattern control means and said column, a weight engageable to and freely movable with the fabric being knitted, a first member movable in accordance with the movement of said weight, a second member movable at a predetermined rate relative to the rotation of the needle cylinder, a rotatably mounted disc, a link engaging said disc to said adjusting mechanism whereby rotation of said disc effects movement of said adjusting mechanism, a reversible motor driving said disc, means for closing alternate correcting circuits through said motor in accordance with differential movements between said members, a centering switch adjoining said disc, a notch in said disc normally aligned with said centering switch, limit switches adjoining said disc on either side of said centering switch, each limit switch being operative to open one of said correcting circuits when engaged by said disc notch, and means actuated by said pattern control means operative to simultaneously open said correcting circuits and to energize said motor to rotate said disc to bring its notch into alignment with said centering switch.

18. A circular knitting machine comprising a rotary needle cylinder mounted for axial movement, pattern control means for axially adjusting the cylinder during the course of a knitting cycle, means for driving said needle cylinder, an adjustment mechanism interposed between said pattern control means and said needle cylinder, a weight engageable to and freely movable with the fabric being knitted, a first shaft member rotatably mounted on the machine, a winding drum fixed to said shaft member, a cable extending between said winding drum and said weight whereby said shaft member rotates in accordance with the movement of said weight, a second member connected to be rotated at predetermined relative rate by said needle cylinder drive, and means operative to displace said adjusting mechanism in accordance with differential rotational movements between said members.

19. A circular knitting machine comprising a rotary needle cylinder mounted for axial movement, pattern control means for axially adjusting the cylinder during the course of a knitting cycle, means for driving said needle cylinder, an adjustment mechanism interposed between said pattern control means and said needle cylinder, a weight engageable to and freely movable with the fabric being knitted, a first shaft member rotatably mounted on the machine, a winding drum fixed to said shaft member, a cable extending between said winding drum and said weight whereby said shaft member rotates in accordance with the movement of said weight, a switch block rotatably mounted on said first shaft member and engageable thereto, a second member disposed adjacent said switch block and connected to be rotated at predetermined relative rate by said needle cylinder drive, and means operative to displace said adjusting mechanism in accordance with differential rotational movements between said switch block and said second member.

20. A circular knitting machine as defined in claim 19, including means associated with said second member operative to disengage said switch block from said first shaft member and to center said switch block with respect to said second member and engage said switch block to said second member.

21. A circular knitting machine as defined in claim 19, including means actuated by said pattern control means and associated with said second member operative to disengage said switch block from said first shaft member and to center said switch block with respect to said second member and engage said switch block to said second member.

22. A circular knitting machine comprising a rotary needle cylinder mounted for axial movement, pattern control means for axially adjusting the cylinder during the course of a knitting cycle, means for driving said needle cylinder, an adjustment mechanism interposed between said pattern control means and said needle cylinder, a weight engageable to and freely movable with the fabric being knitted, a shaft connected to be rotated with downward movement of said weight, a switch block rotatably mounted on said shaft and engageable thereto, a detection cylinder rotatably mounted on said shaft and enclosing said switch block, said detection cylinder being connected to be rotated at predetermined relative rate by said needle cylinder drive, and means operative to displace said adjustment mechanism in accordance with differential rotational movements between said switch block and said detection cylinder.

23. A circular knitting machine as defined in claim 22, wherein said switch block is provided with a switch pivotally mounted thereon and extending generally radially of said shaft, said switch being frictionally engaged to the inner surface of said detection cylinder and adapted to close alternative circuits when said switch block is angularly displaced in either direction from centered position relative to said detection cylinder and said switch is displaced about its pivot in opposite direction.

24. A circular knitting machine comprising a rotary needle cylinder mounted for axial movement, pattern control means for axially adjusting the cylinder during the course of a knitting cycle, means for driving said needle cylinder, an adjustment mechanism interposed between said pattern control means and said needle cylinder, a weight engageable to and freely movable with the fabric being knitted, a shaft connected to be rotated with downward movement of said weight, a switch block rotatably mounted on said shaft and engageable thereto, a switch pivotally mounted on said switch block and extending generally radially of said shaft, side contacts on said switch, fixed contacts on said switch block facing said side contacts, angularly offset arcuate conducting segments mounted on said switch block, each of said conducting segments being connected to one of said fixed contacts, a detection cylinder rotatably mounted on said shaft and enclosing said switch block, angularly offset brushes in said detection cylinder, one of said brushes being disposed to be contacted by one of said switch block segments when the switch block is angularly displaced relative to the detection cylinder in one direction and the other of said brushes being disposed to be contacted by the other segment when the switch block is angularly displaced relative to the detection cylinder in the opposite direction, said detection cylinder being connected to be rotated at predetermined relative rate by said needle cylinder drive, and means operative to displace said adjustment mechanism in accordance with angular displacements between said switch block and said detection cylinder.

25. A circular knitting machine as defined in claim 24, including slip rings peripherally mounted on said detection cylinder, each slip ring being in electrical contact with one of said brushes.

26. A circular knitting machine comprising a rotary needle cylinder, needle cams cooperative with said needle cylinder, pattern control means for effecting relative axial movement between said needle cylinder and said needle cams during the course of a knitting cycle, a first member movable at a rate proportional to actual fabric production, a second member movable at a predetermined rate relative to the rotation of the needle cylinder, a detecting mechanism adapted to generate electrical signals in accordance with differential movements between said members, and a correcting mechanism adapted to introduce an adjustment between said needle cylinder and said needle cams in accordance with signals generated by said detecting mechanism.

27. A circular knitting machine comprising a rotary needle cylinder mounted for axial movement, pattern control means for axially adjusting the cylinder during the course of a knitting cycle, a first member movable at a rate proportional to actual fabric production, a second member movable at a predetermined rate relative to the rotation of the needle cylinder, a detecting mechanism adapted to generate electrical signals in accordance with differential movements between said members, and a correcting mechanism adapted to introduce an adjustment between said needle cylinder and said pattern control means in accordance with signals generated by said detecting mechanism.

28. A circular knitting machine as defined in claim 27, including means actuated by the pattern control means to deactivate said detecting mechanism during predetermined portions of the knitting cycle.

29. A circular knitting machine as defined in claim 27, including means actuated by the pattern control means to simultaneously disconnect said correcting mechanism from said detecting mechanism and restore said needle cylinder and said pattern control means to normal unadjusted relative relationship during predetermined portions of the knitting cycle.

30. A circular knitting machine as defined in claim 27, including means actuated by the pattern control means to deactivate said detecting mechanism during predetermined portions of the knitting cycle, and means actuated by the pattern control means to simultaneously disconnect said correcting mechanism from said detecting mechanism and restore said needle cylinder and said pattern control means to normal unadjusted relative relationship during predetermined portions of the knitting cycle.

31. A circular knitting machine as defined in claim 27, including means operative to vary the relative rate of movement of said second member during a preselected portion of the knitting cycle.

32. A circular knitting machine comprising a rotary needle cylinder mounted for axial movement, pattern control means mechanically engaged to said cylinder for adjusting the cylinder in axial direction during the course of a knitting cycle, means for detecting variations from the planned regularity of courses, and means operative to introduce an adjustment between said needle cylinder and said pattern control means in accordance with variations detected by said detecting means.

33. A circular knitting machine comprising an axially movable column and a rotary needle cylinder supported thereby, cam means mechanically engaged to said column for adjusting the column in axial direction during the course of a knitting cycle, means for detecting variations from the planned rate of fabric production established by said cam means, and means operative to introduce an adjustment between said needle cylinder and said cam means in accordance with variations detected by said detecting means.

34. A circular knitting machine comprising a rotary needle cylinder mounted for axial movement, pattern control means mechanically engaged to said cylinder for adjusting the cylinder in axial direction during the course of a knitting cycle, an adjustment mechanism interposed between said pattern control means and said needle cylinder, means for detecting variations from the planned stitch loop length established by said pattern control means, and means operative to superimpose a correcting adjustment between said needle cylinder and said pattern control means in accordance with variations detected by said detecting means.

References Cited in the file of this patent
UNITED STATES PATENTS

| | | |
|---|---|---|
| 1,068,527 | Paxton et al. | July 29, 1913 |
| 2,685,786 | Stack | Aug. 10, 1954 |